United States Patent
Katzer

(10) Patent No.: US 7,409,379 B1
(45) Date of Patent: Aug. 5, 2008

(54) APPLICATION CACHE MANAGEMENT

(75) Inventor: Robin Dale Katzer, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 445 days.

(21) Appl. No.: 10/628,151

(22) Filed: Jul. 28, 2003

(51) Int. Cl.
- G06F 7/00 (2006.01)
- G06F 17/30 (2006.01)
- G06F 17/00 (2006.01)
- G06F 12/00 (2006.01)
- G06F 13/00 (2006.01)
- G06F 13/28 (2006.01)

(52) U.S. Cl. .................... 707/1; 707/100; 707/3; 707/104.1; 711/118

(58) Field of Classification Search ............ 707/3, 707/202, 1, 100, 104.1; 709/214; 711/118
See application file for complete search history.

(56) References Cited

U.S. PATENT DOCUMENTS

| | | | | |
|---|---|---|---|---|
| 5,465,352 A | * | 11/1995 | Nakazawa et al. | ............. 707/3 |
| 5,870,763 A | * | 2/1999 | Lomet | ................ 707/202 |
| 6,901,383 B1 | * | 5/2005 | Ricketts et al. | ............ 705/37 |
| 7,020,750 B2 | * | 3/2006 | Thiyagaranjan et al. | ..... 711/141 |
| 2002/0065899 A1 | * | 5/2002 | Smith et al. | ............... 709/214 |
| 2002/0107835 A1 | * | 8/2002 | Coram et al. | ................. 707/1 |

OTHER PUBLICATIONS

The TimesTen Team, "Mid-Tier Caching: The TimesTen Approach" Jun. 2002, ACM SIGMOD, TimesTen.*
Graves, Steve, "In-Memory Database Systems" Sep. 2002, www.linuxjournal.com, p. 1-6.*

* cited by examiner

Primary Examiner—Apu Mofiz
Assistant Examiner—Brent Stace

(57) ABSTRACT

A cache management system including an in-memory database system for managing cached data is provided. The cache management system includes an application, a wrapper and an engine. The application utilizes data and has a rule related to the cache management of the data. The wrapper is operable to receive data from the application and provide at least a portion of the data and a component of the rule to the in-memory database system. The engine is operable to monitor the in-memory database system and apply the rule to the cached data. A method for managing cache data is also provided.

28 Claims, 7 Drawing Sheets

APPLICATION CACHE MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The field of the present invention includes computer database management systems. More particularly, embodiments of the present invention are concerned with managing in-memory database cache employing application specific rules.

BACKGROUND OF THE INVENTION

In-memory database management system (IMDBMS) software products store data in local computer memory, such as in random access memory, for fast access. IMDBMS products may be employed in association with a disk-based database management system (DBMS) which may be employed to support long term persistence of some of the data. While some enterprises may develop their own database management systems, most buy these systems as commercial off-the-shelf, hereafter COTS, software packages and build their data applications on top of these COTS packages.

Data employed by applications may need to be stored in an IMDBMS only on the server supporting the application itself or may need to be shared among multiple servers. The data may have only a transient utility and may be deleted after an interval of time or after a period of non-use. Such transient data should be removed from the IMDBMS when its utility has expired. Other data may have only transient utility, but require long-term persistence for record keeping purposes. Such data should be stored in long term storage, such as disk-based DBMS, and then removed from IMDBMS when its utility has expired. Such different data requirements of applications may be articulated as rules or policies.

It is incumbent on each application to implement these data cache management rules and interact with the IMDBMS to delete transient data, for example, at the appropriate times and to interact with the disk-based DBMS to write-back data requiring long-term persistence. Implementing data management rules adds to the complexity of developing applications and may involve solving the same problem multiple times if different applications are developed by different designers or different teams of designers, perhaps located at different corporate development sites. Additionally, implementing data management rules in the application increases the processing load associated with the application. If the long term storage mechanism changes, the applications may need to be redeveloped to interact with a different long term storage mechanism.

SUMMARY OF THE INVENTION

The present embodiment provides a cache management system including an in-memory database system for managing cached data. The cache management system also includes an application, an in-memory database, a wrapper and an engine. The application utilizes data and has a rule related to the cache management of the data. The wrapper is operable to receive the data from the application and provide at least a portion of the data and a component of the rule to the in-memory database system. The engine is operable to monitor the in-memory database system and apply the rule to the cached data. A method for managing cache data is also provided.

In one embodiment, a cache management system is provided that includes an application, a wrapper, and an engine. The application utilizes data and has a rule related to caching the data. The wrapper is in communication with the application to receive at least a component of the rule. The engine is operable to receive at least a component of the rule from the wrapper and apply the rule to the cached data. In another embodiment, the cache management system further comprises an in-memory database for managing cache data. The in-memory database further includes a storage portion for storing the data utilized by the application and a table operable to maintain a rule event related to the rule for caching data. The rule event points to a location in the storage portion of the in-memory database where the data related thereto is stored. In another embodiment, the wrapper is further operable to provide at least a portion of the data from the application and a component of the rule to the in-memory database. In this embodiment, the engine is operable to poll the in-memory database and apply the rule related to the rule event to the data.

These and other features and advantages will be more clearly understood from the following detailed description taken in conjunction with the accompanying drawings and claims. It is important to note that the drawings are not intended to represent the only form of the invention.

BRIEF DESCRIPTION OF THE DRAWINGS

For a more complete understanding of the present disclosure and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
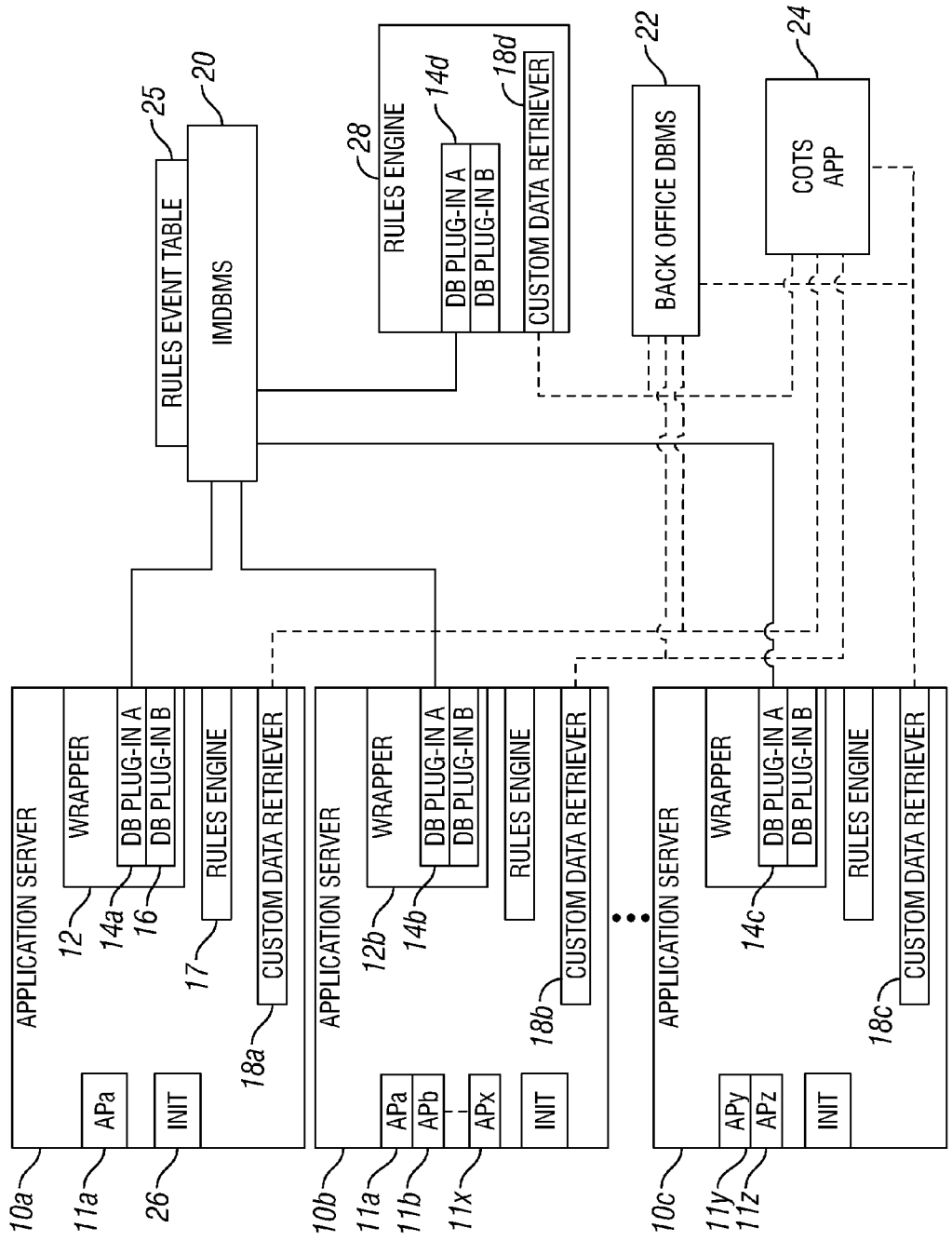
FIG. 1 is a block diagram, according to one embodiment, of a software architecture for implementing a cache management system of the present disclosure.

It should be understood at the outset that although an exemplary implementation is illustrated below, the application cache management system may be implemented using any number of techniques, whether currently known or in existence. The present disclosure should in no way be limited to the exemplary implementations, drawings, and techniques illustrated below, including the exemplary design and implementation illustrated and described herein.

IMDBMSs store data in memory, such as in random access memory but may also include disk memory in some cases or for some portions of the data, which may be referred to as caching the data. It is the role of the IMDBMS software to keep cached data synchronized across multiple application platforms so that all application servers using the cached data see the same data values as the data is accessed. The IMDBMS software, however, may not know or be operable to implement the specific requirements of enterprise applications for refreshing or otherwise managing cached data or removing data from cache.

For example, a customer data object may be of use to an application for a specific period of time, such as 30 minutes or less. In some instances, it is efficient to retain the customer data object in cache, but the application should remove the customer data object from cache after this 30 minute period expires. It is inefficient and perhaps impossible in some instances, however, for the application to implement these application specific data cache management rules.

Common application specific cache data management rules, which may be referred to hereinafter sometimes simply as rules, may be classified as (1) data refreshment from long term storage, such as by a disk-based DBMS at periodic intervals, (2) data refreshment on an ad hoc basis from long term storage, (3) data removal from cache after an application specific length of time, (4) data removal from cache after an application specific length of time of non-use, (5) data removal from cache after an application specific length of time with data written back to long term storage, (6) data removal from cache after an application specific length of time of non-use with data written back to long term storage, and (7) data removal from cache when marked by the application for removal. Another rule may apply if an attempt to read a data item from cache fails and the application needs the data to be read in from long term storage: this treatment may be referred to as (8) 'does not exist retrieval.' These are called common rules because any application may use all these rules. Other rules which are not common may also be defined by application programs. An example of such a rule will be given hereinafter.

Rules 2, 7, and 8 may be considered synchronous data manipulations with respect to the application while the other data treatments may be considered asynchronous data manipulations with respect to the application. The present embodiment is not limited to these or other rules not enumerated above, whether defined as synchronous, asynchronous or otherwise, and which will readily suggest themselves to one of ordinary skill in the art and are within the spirit and scope of the present disclosure. These several data management rules may be associated with scripts, programs, subroutines, methods, or functions and/or any operation which may be executed to manipulate the data in a desirous manner.

Turning now to FIG. 1 an exemplary architectural diagram of one embodiment of the present disclosure is depicted. Application server 10a is an application execution platform supporting connections to the resources and services that application programs, hereinafter referred to as applications, may require. Applications may include billing programs, provisioning programs, network management applications or numerous other applications which will readily suggest themselves to one of ordinary skill in the art. While the application server 10a may offer multiple services to applications, such as restart of failed applications, automated fail-over, load balancing, application cache management, for example, only the services related to application cache management are depicted in FIG. 1 and discussed below. The application server 10a may execute on a general purpose computer system which will be discussed in more detail hereinafter.

Multiple application servers 10b through 10c having substantially the same architecture with respect to cache management as application server 10a are depicted. Their cache interactions are substantially similar to those described below with respect to application server 10a. Some embodiments may consist of only a single application server, but other embodiments may consist of a multiplicity of servers as depicted in FIG. 1.

The application servers 10b through 10c may similarly execute on a general purpose computer system which will be discussed in more detail hereinafter. A general purpose computer system may be referred to by the name of the principle or only application executing on that system. For example, a general purpose computer on which application server executes and on which a billing application program executes may be known as the "billing server."

For purposes of clarity and understanding, a brief discussion of application servers 10 and applications may be useful. In one embodiment, the application servers 10 may be duplicated across multiple general purpose computing systems. In this embodiment, each application server 10 may run its own unique application programs, or some application programs may be duplicated on one or more application servers 10. The duplication of a single application program may be referred to as 'instantiations' of the application program on one or more application servers 10. For example, multiple instances of a provisioning application may run on one or more application servers 10 to distribute the load of the provisioning application. The provisioning application may be said to be instantiated on one or more application servers 10.

An exemplary application 11a is depicted as executing on the application server 10a. A second instance of the application 11a may also execute on the application server 10b to distribute the processing load to multiple application servers. Applications 11a through 11x may execute on the application server 10b while applications 11y and 11z may execute on application server 10c. In some embodiments, one or more of the application servers 10a through 10c may be dedicated to a single application.

According to one embodiment, a wrapper 12 is in communications, such as by an interface or otherwise, with the application 11a. In this manner, the application 11a passes data and any rules associated with the cache management requirements of the data utilized by the application 11a to the wrapper 12. In some embodiments, an IMDBMS plug-in 14a is provided to enable communication between the wrapper 12 and an IMDBMS 20. The IMDBMS plug-in 14a is operable to promote communication between the wrapper 12 and the IMDBMS 20. The IMDBMS plug-in 14*a* may be a translator or interface or other system provided with similar functionality.

According to other embodiments, one or more IMDBMS plug-ins 16 may be provided to enable communication between the wrapper 12 and additional IMDBMS. In some embodiments the wrapper 12 communicates with a rules engine 17 which may support some cache management operations. In this embodiment, a custom data retriever plug-in 18*a* is also provided to similarly enable communication between the rules engine 17 and a back office database 22 and a legacy COTS application 24. In some embodiments there may be multiple legacy COTS applications 24 with which the custom data retriever plug-in 18*a* communicates. It should be appreciated that fewer or more plug-ins with varying functionality may be utilized and are within the spirit and scope of the present disclosure. According to other aspects, it may be advantageous to build support for one or more IMDBMS and back office system directly into the wrapper 12, such as by hard-coding or otherwise enabling such functionality in the wrapper 12.

The wrapper 12 is operable to receive the data from the application 11*a* and "wrap" the data with the cache management rule of the application 11*a*. In some embodiments, the application 11*a* may provide a rule type related to the data to the wrapper 12. In such embodiment, the rule type may be relationally related to the complete rule or instruction set for management of the data in cache memory. As such, the complete rule or rules utilized by the application 11*a* or application server 10*a* may be loaded in a number of manners that will readily suggest themselves to one skilled in the art. For example, the rules may be loaded at the start-up of the application 11*a* or application server 10*a* from or into a data file, into memory or otherwise.

The "wrapping" process may include both the aspect of wrapping the data and of adding the rule related information, such as rule type, to the data transmitted by the application 11*a*. When the application 11*a* reads data from or writes data to the IMDBMS it does so, in the present embodiment, via the services offered by the wrapper 12. When the application 11*a* desires to write a data item to cache, the wrapper 12 receives the data item from the application 11*a* and adds additional rule information before communicating the wrapped data to the IMDBMS 20. When the application 11*a* reads a data item from cache, according to one aspect of the present embodiment, the wrapper 12 obtains data from cache, and may strip the additional information off the data item, and returns the simple data item to the application 11*a*. In other aspects, data may be passed directly to the application 11*a* in a manner that bypasses the wrapper 12.

The IMDBMS plug-in 14*a* is in communication with an IMDBMS 20, which manages certain aspects of the in-memory cache data. Data that is accessed by the application server 10*a* is accessed, through the intermediary of the wrapper 12, via the IMDBMS plug-in 14*a*. Data that is accessed by other application servers 10, such as application server 10*b*, may be similarly accessed via wrapper 12*b* and IMDBMS plug-in 14*b*.

The rules engine 17 may perform synchronous cache operations such as ad hoc data refresh operations (rule 2) for those applications 11*a* executing on its application server 10*a*. In this embodiment, the rules engine 17 typically may execute on the same general purpose computer system that the application server 10*a* executes upon.

The custom data retriever plug-in 18*a* is in communication with one or more back office DBMSs 22 which may be supported by different DBMS COTS packages and may be located in third party enterprises, such as a billing service company. The back office DBMSs 22 may be executed on one or more general purpose computer systenis to be discussed in more detail hereinafter. One example of a DBMS COTS package that is compatible with the present disclosure is the ORACLE DBMS that may execute on a computer system using the UNIX operating system.

The IMDBMS 20 supports the IMBDMS plug-ins 14*a*-14*c* located in the various application servers 10*a* through 10*c*. The IMDBMS 20 keeps the data shared among the application servers 10 consistent or synchronized. It should be appreciated that the IMDBMS 20 may include, according to one aspect, an IMDBMS operable on a computer server (and hence may be called an IMDBMS server), although a number of configurations and deployments are within the scope of the present disclosure. Examples of IMDBMS COTS packages that are compatible with the present disclosure are TIMESTEN and VERSANT. Other IMDBMS COTS packages may also be compatible with the present disclosure. In one embodiment the IMDBMS 20 may execute on a general purpose computer system. In another embodiment the IMDBMS 20 may share a general purpose computing system with an application server 10 or with other programs.

In one embodiment, the application server 10*a* includes an initialization module 26 whose role is to write application specific data management rule definitions—both common rule definitions and non-generic or uncommon rule definitions—into the cache. Rule definitions describe, in some manner, the functional behavior that is to occur to maintain the data associated with the rule. The rule definitions may be described through XML scripting or other means. In other embodiments, the rule definitions may be stored and utilized in other manners. The rule definitions are associated with a rule type identifier or rule name or database key by which the rule definition may be accessed. The initialization module 26 executes when the application server 10*a* is started and then exits on completion of its initialization actions. The rule definitions may be coded in the initialization module 26 or may be read in from a configuration file. The initialization module 26 employs the application programming interface (API) of the wrapper 12 to write the rule definitions into cache, a file or otherwise. In some embodiments, the applications 11 may also write rule definitions into the cache, via the intermediary of the wrapper 12.

In the present embodiment, a second rules engine 28 has the role of acting on some or all of the data cache or other management rules. To support this role, the second rules engine 28, according to the present embodiment, has an IMDBMS plug-in 14*d* and a custom data retriever plug-in 18*d*. The second rules engine 28 has access to the rules definitions, which may include that complete instruction set for acting on the data, stored in cache, for example, during initialization of each of the application servers 10*a* through 10*c* via its IMDBMS plug-in 14*a*-14*c*. The IMDBMS 20 keeps all in-memory cache consistent or synchronized. Data that is present in the cache is visible to application server 10*a* is also visible to the cache and visible to the second rules engine 28, as well as to the other application servers 10*b* through 10*c*. It should be appreciated that the actual memory location where the data is cached may be local to the application server 10*a*, the IMDBMS 20 or on other systems provided with such memory or storage capability.

According to one aspect, the IMDBMS 20 contains a rules event table 25 whose entries include a rule type or rule event and a reference to the data associated with the rule type, such as a pointer. The rule type identifies a rule definition which fully describes the function to be applied to the data. The rule event or type entry is provided by the wrapper 12 when a data item is first entered into the cache by an application. In this embodiment, the second rules engine 28 is operable to periodically poll or query, based on the rules, the IMBDMS 20. In this manner, the second rules engine 28 identifies cached data with the associated rule type. After identifying the cached data and the rule type, the second rules engine 28 applies the rule to the related data, thereby implementing the application 11a specific rule outside of the IMDBMS 20. It can be seen that this functionality provides implementation of application 11a specific rules without the inefficiencies associated with these rules being implemented by the application 11a. In addition, the present embodiment provides cache management of data functionality not provided by the IMDBMS 20, which promotes greater efficiency throughout the system.

The second rules engine 28 may monitor cache data by polling the rules event table 25 and data items in the cache. When a rule associated with a data item is ready to be executed, the second rules engine 28 looks up the associated rule definition, accesses the data item, and performs the cache management operation defined by the rule upon the data item. The wrapper 12 may build an event table in the IMDBMS 20 which links data items with rule types. The rule type may be associated with rule definitions. The second rules engine 28 may monitor this rule event table by polling the table. The second rules engine 28 may be distinguished from the rules engine 17 by this polling activity. In other aspects, the rules engine 17 and second rules engine 28 may be combined.

In one embodiment the second rules engine 28 may run on a dedicated general purpose computing system, which will be discussed in detail hereinafter. In another embodiment the second rules engine 28 may share a general purpose computing system with an application server or other programs. In another embodiment the second rules engine 28 may share a general purpose computing system with the IMDBMS 20.

When the application 11a writes a given data item for the first time into cache it may provide the wrapper 12 with the data item, a key for referencing the data item, and the rule type to associate with the data item. The wrapper 12 then writes the data item into the cache, along with its reference key, and writes a rule event entry into the rules event table 25. The rules event entry comprises a reference to the associated data item and the data type. The wrapper 12 may add information which supports management of the cache data including date and time. In some embodiments the IMDBMS 20 may add date and time to data items in cache, in which case the wrapper 12 does not add this information. When this or other applications access this same data in the future, the wrapper 12 may or may not, depending on the rule governing this data item, update the data wrapper. If rule 3 applies (removal from cache after an application specific length of time) there is no need to update the data wrapper since the only information relevant to when to remove the data from cache is when the data item was first written to cache. If rule 4 applies (removal from cache after an application specific length of time of non-use) then it is important to update the date and time associated with the data item to capture the most recent use. Again, if the IMDBMS 20 provides such functionality, the wrapper 12 does not add this information.

If the application 11a attempts to access a data item which is not in cache and the data type is associated with rule 8 (does not exist retrieval), the wrapper 12 may request that the rules engine 17 read the data item out of the back office DBMS 22 via the services of the custom data retriever 18a. The rules engine 17 returns the desired data to the wrapper 12 which writes the returned data and appropriate rule type into cache and returns the unwrapped data item to the requesting application. This sequence is said to be a synchronous data manipulation because the data manipulation is performed in direct response to an application action.

Figure 2:
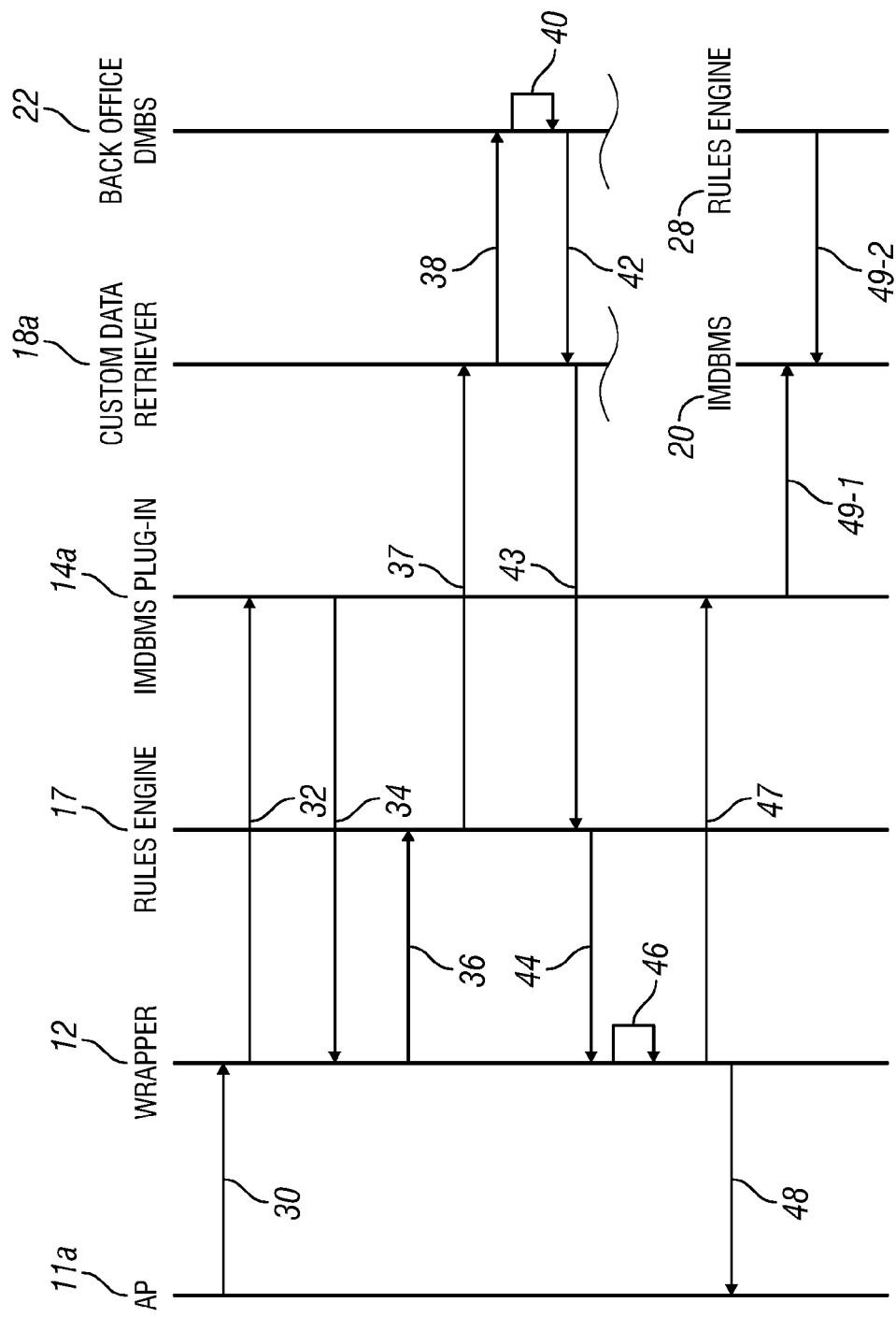
FIG. 2 depicts an exemplary message sequence for an application requesting data from the cache management system where the data is not in cache and for which the 'does not exist retrieval' data management rule applies.

Turning now to FIG. 2 the above data flow scenario is explicitly illustrated. The application 11a sends a read request message 30 for a data item to the wrapper 12. The wrapper 12 sends a read request message 32 for the data item to the IMDBMS plug-in 14a. The data item is not in cache, and the IMDBMS plug-in 14a sends a read request item-not-found message 34 to the wrapper 12. The wrapper 12 sends a read request message 36 for the data item to the rules engine 17. The rules engine 17 sends a read request message 37 for the data item to the custom data retriever plug-in 18a. The custom data retriever plug-in 18a sends a read request message 38 for the data item to the back office DBMS 22. The back office DBMS 22 looks-up and fetches the data item in action 40. The back office DBMS 22 sends the data in a data return message 42 to the custom data retriever plug-in 18a. The custom data retriever sends the data in a data return message 43 to the rules engine 17. The rules engine 17 sends the data in a data return message 44 to the wrapper 12. The wrapper 12 adds rule type, which may have been received from the application 11a, and also adds date and time information, and optional supplemental information to the data item in action 46. The wrapper 12 sends the data constellation in a data write message 47 to the IMDBMS plug-in 14a.

In some aspects, the wrapper 12 may be operable to strip off the rule type, date and time information, and sends the simple data item in a data return message 48 to the application 11a. In some embodiments, as noted above, the date and time information may be supplied by the IMDBMS plug-in 14a rather than the wrapper 12.

The IMDBMS plug-in 14a provides the wrapped data 49-1 to the IMDBMS 20, which stores the data in cache and associates a component of the rule, such as a rule type, to the data and stores the rule type in the rules event table 25 or other location. The second rules engine 28 periodically queries 49-2 the IMBDMS server 20 to apply the rule to the cached data in the IMDBMS 20. Note that these two messages—49-1 and 49-2—are not part of the synchronous data management action, but are shown to aid comprehension of system operation. Message 49-1 occurs as part of the normal operation of the IMDBMS 20 maintaining synchronization of data cache across all cache users. Message 49-2 is an on-going message the second rules engine 28 periodically sends to the IMDBMS 20.

If the application 11a requests that a data item be refreshed from the back office DBMS 22 (data rule 2), the wrapper 12 requests that the rules engine 17 read the data item out of the back office DBMS 22 via the services of the custom data retriever plug-in 18a. The rules engine 17 requests the data from the custom data retriever plug-in 18a. The custom data retriever plug-in 18a reads the data out of the back office DBMS 22 and returns the data to the rules engine 17. The rules engine 17 returns the data to the wrapper 12. The wrapper 12 writes the returned data—updated with appropriate rule index, date and time, and supplemental information—into cache and returns the unwrapped data item to the application 11a. In another embodiment the wrapper 12 may signal the second rules engine 28 so that the second rules engine 28 may read the data item out of the back office DBMS 22 via the services of its custom data retriever 18d. The second rules engine 28 then writes the returned data—updated with appropriate date and time and optional supplemental information—into cache. The wrapper 12 then reads the data item out of cache, strips off the rule and optional supplemental information, and returns the simple data to the application 11a. This is said to be a synchronous data manipulation because the data manipulation is performed in direct response to an application action.

If the application 11a marks a data item for removal from cache (data rule 7), the wrapper requests the rules engine 17 to remove the data from cache. The rules engine 17 then removes the data from cache and removes the rules table entry associated with the data item from the rules table. In another embodiment, the wrapper 12 may signal the second rules engine 28 so that the second rules engine 28 deletes the data item from cache and remove the rules event table 25 entry associated with the data item from the rules event table 25. This is said to be a synchronous data manipulation because the data manipulation is performed in direct response to an application action.

An example of an uncommon, non-generic rule will now be discussed briefly. The application 11 may wish to have a data item stay in cache for a specific length of time and then be removed from cache with part of the data item stored in the back office DBMS 22 and part of the data item stored in the COTS application 24. The rule which effects this kind of cache data maintenance is highly specific to the particular application 11. Such special cases are likely to exist for applications, and the contemplated application cache management system is flexible enough to handle these special cases.

The remaining data manipulation rules may be described as asynchronous, and the associated data manipulations may be handled, according to the present embodiment, by the second rules engine 28. The second rules engine 28 has visibility to cached data via its own IMDBMS plug-in 14d and monitors this cache for changes. When a cached data item is modified, the second rules engine 28 has access to this information. This access may be through a database trigger mechanism if the IMDBMS 20 supports trigger mechanisms, or the second rules engine 28 may periodically poll data items.

When a tenure of a data item expires (rules 3-6) the second rules engine 28 removes the data item from cache and removes the rules table entry associated with the data item from the rules table. If rules 5 or 6 are invoked, the second rules engine 28 writes the data back to the back office DBMS 22 via its custom data retriever plug-in 18d. If a data item is governed by rule 1 and is due for its periodic refresh, the second rules engine 28 reads the data item from the back office DBMS 22 via its custom data retriever plug-in 18d and then writes the data item into its cache.

If the IMDBMS 20 supports keeping some portion of cache local—meaning the data in this local area of cache is not accessible outside of the application server 10 on which the data is local, hence is not visible to the IMDBMS 20 or other application servers 10—this data may be managed by the application itself. Alternately, if the IMDBMS 20 does not support keeping some portion of cache local, information which needs to be kept purely local may be stored in application memory outside of cache. Such local data may comprise machine specific data or application instance specific data.

Figure 3:
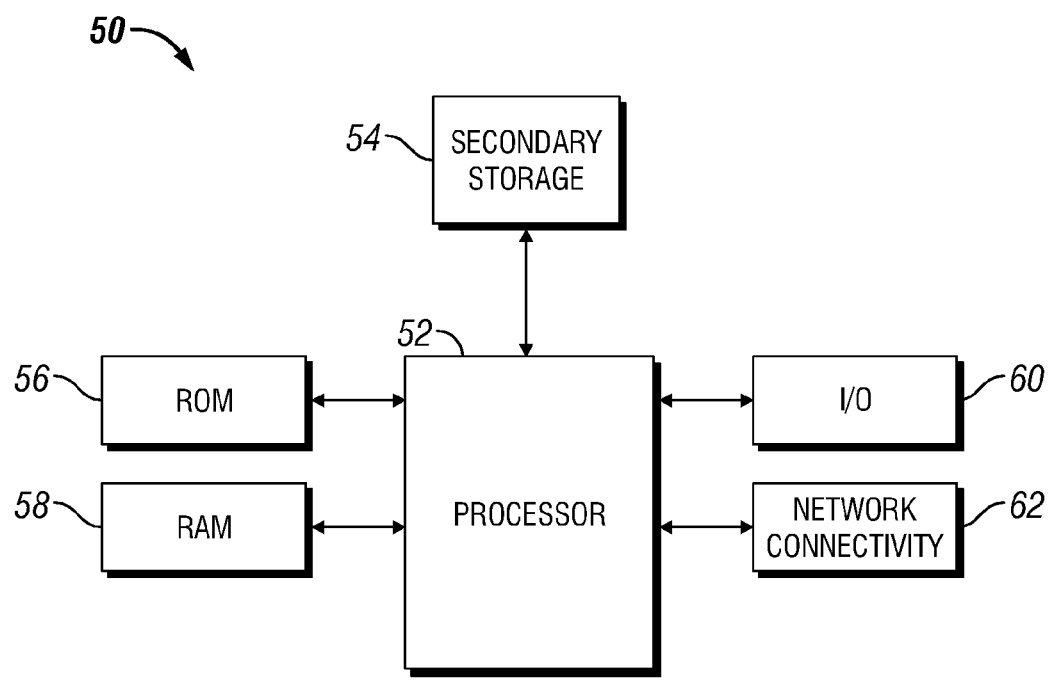
FIG. 3 illustrates an exemplary general purpose computer system suitable for implementing one embodiment of the cache management system.

The software applications described above may be implemented on any general-purpose computer with sufficient processing power, memory resources, and network throughput capability to handle the workload placed upon it. FIG. 3 illustrates a typical, general-purpose computer system suitable for implementing the present invention. The computer system 50 includes a processor 52 (which may be referred to as a central processor unit or CPU) that is in communication with memory devices including secondary storage 54, read only memory (ROM) 56, random access memory (RAM) 58, input/output (I/O) devices 60, and network connectivity devices 62. The processor may be implemented as one or more CPU chips.

The secondary storage 54 is typically comprised of one or more disk drives or tape drives and is used for non-volatile storage of data and as an over-flow data storage device if RAM 58 is not large enough to hold all working data. Secondary storage 54 may be used to store programs which are loaded into RAM 58 when such programs are selected for execution. The ROM 56 is used to store instructions and perhaps data which are read during program execution. ROM 56 is a non-volatile memory device which typically has a small memory capacity relative to the larger memory capacity of secondary storage. The RAM 58 is used to store volatile data and perhaps to store instructions. Access to both ROM 56 and RAM 58 is typically faster than to secondary storage 54.

I/O devices 60 may include printers, video monitors, keyboards, mice, track balls, voice recognizers, card readers, paper tape readers, or other well-known input devices. The network connectivity devices 62 may take the form of modems, modem banks, ethernet cards, token ring cards, fiber distributed data interface (FDDI) cards, and other well-known network devices. These network connectivity 62 devices may enable the processor 52 to communicate with an Internet or one or more intranets. With such a network connection, it is contemplated that the processor 52 might receive information from the network, or might output information to the network in the course of performing the above-described method steps. Such information, which is often represented as a sequence of instructions to be executed using processor 52, may be received from and outputted to the network, for example, in the form of a computer data signal embodied in a carrier wave.

The processor 52 executes instructions, codes, computer programs, scripts which it accesses from hard disk, floppy disk, optical disk (these various disk based systems may all be considered secondary storage 54), ROM 56, RAM 58, or the network connectivity devices 62.

Figure 4:
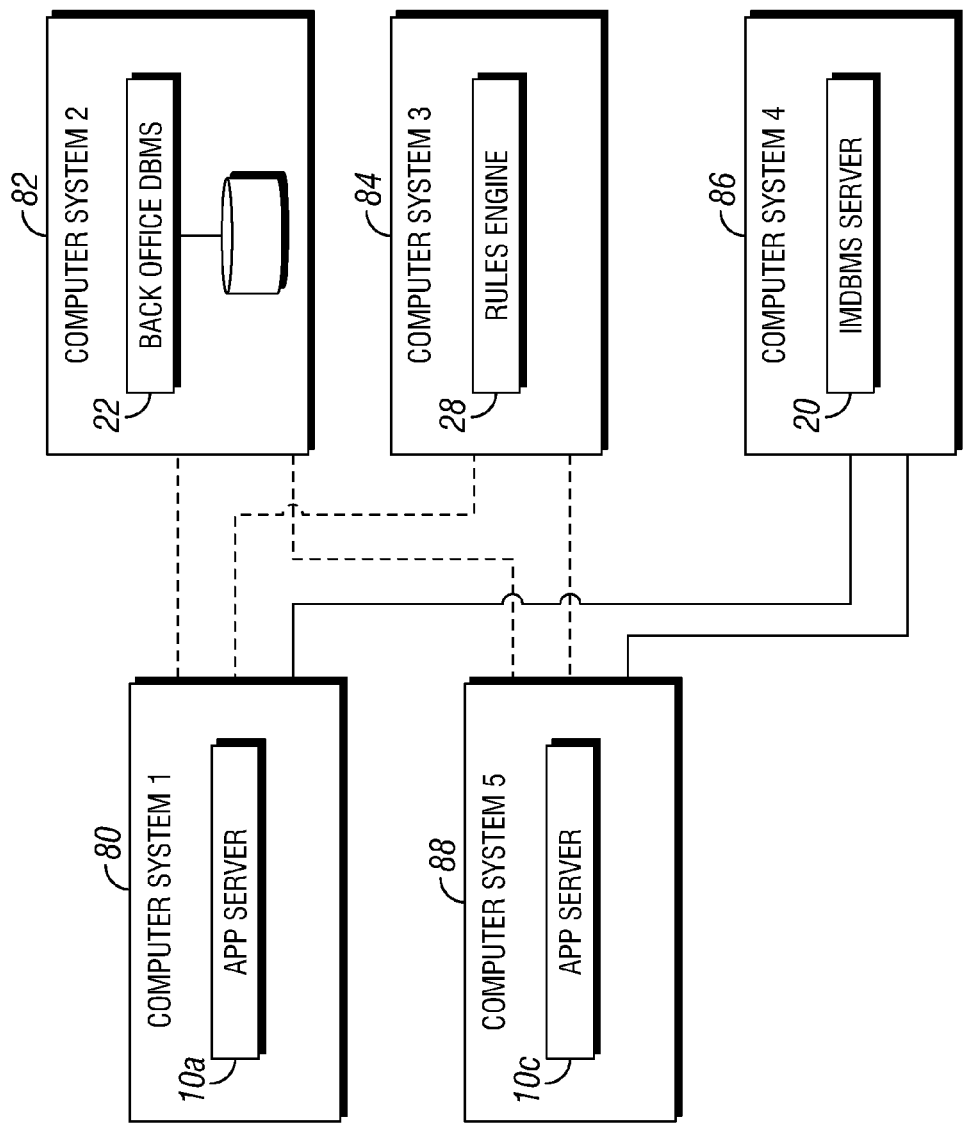
FIG. 4 is a block diagram of one embodiment of the cache management system with application servers, a rules engine, an IMDBMS server, and a back office DBMS are shown operable on separate computer systems.

Turning now to FIG. 4 the location on computers of programs cooperating in one embodiment is depicted. The application server 10a is executing on general computer system #1 80. The back office DBMS 22 executes on general computer system #2 82. The second rules engine 28, which, in some embodiments, may include functionality of rules engine 17, is executing on general computer system #3 84. The IMDBMS 20 is executing on general computer system #4 86. The application server 10c is executing on general computer system #5 88. Note that some of these general computer systems may be several computers networked together to increase the collective processing power.

Figure 5:
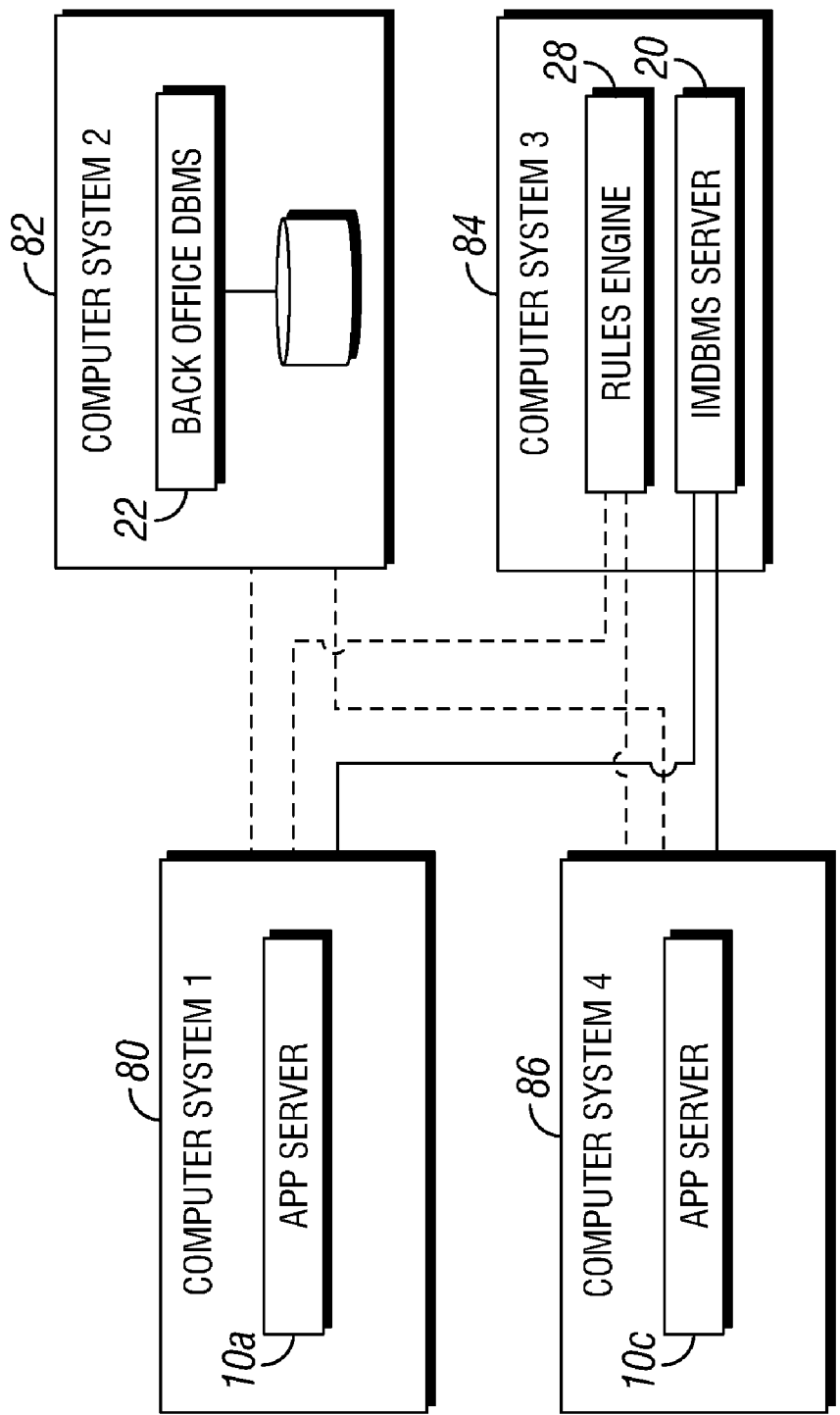
FIG. 5 is a block diagram of yet another embodiment of the cache management system illustrating the application servers and the back office DBMS operable on separate computer systems and the rules engine and IMDBMS server both shown operable on a single computer system.

Turning now to FIG. 5 the location on computers of programs cooperating in another embodiment is depicted. The application server 10a is executing on general computer system #1 80. The back office DBMS 22 executes on general computer system #2 82. The second rule engine 28 and IMDBMS 20 are both executing on general computer system #3 84. The application server 10c is executing on general computer system #4 86. Note that some of these general computer systems may be several computers networked together to increase the collective processing power.

Figure 6:
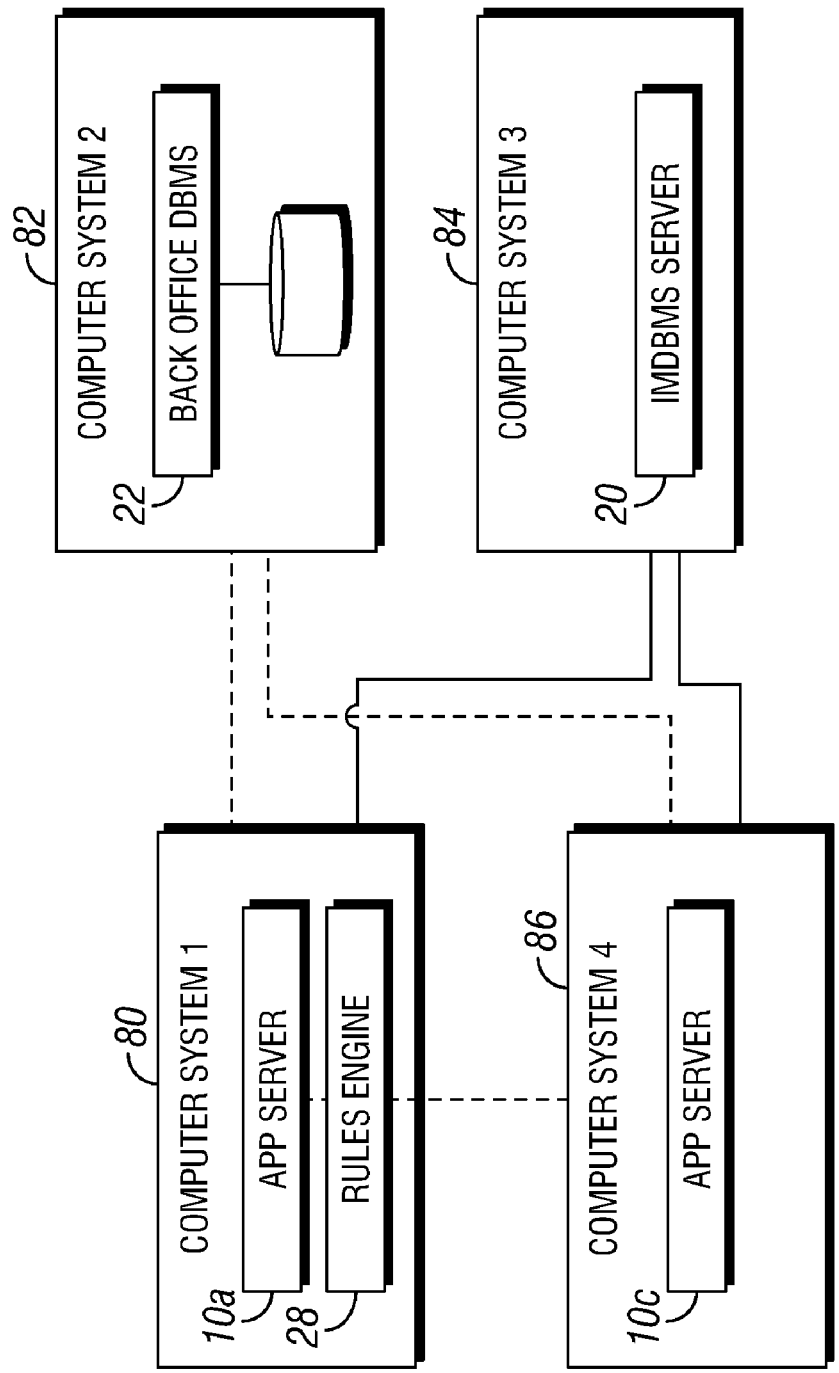
FIG. 6 is a block diagram of another embodiment in which the back office DBMS, the IMDBMS server, and one or more application servers are operable on separate computer systems and where one application server and the rules engine are both operating on the same computer system.

Turning now to FIG. 6 the location on computers of programs cooperating in another embodiment is depicted. The application server 10a and the second rules engine 28 are executing on general computer system #1 80. The back office DBMS 22 executes on general computer system #2 82. The IMDBMS 20 is executing on general computer system #3 84. The application server 10c is executing on general computer system #4 86. Note that some of these general computer systems may be several computers networked together to increase the collective processing power.

Figure 7:
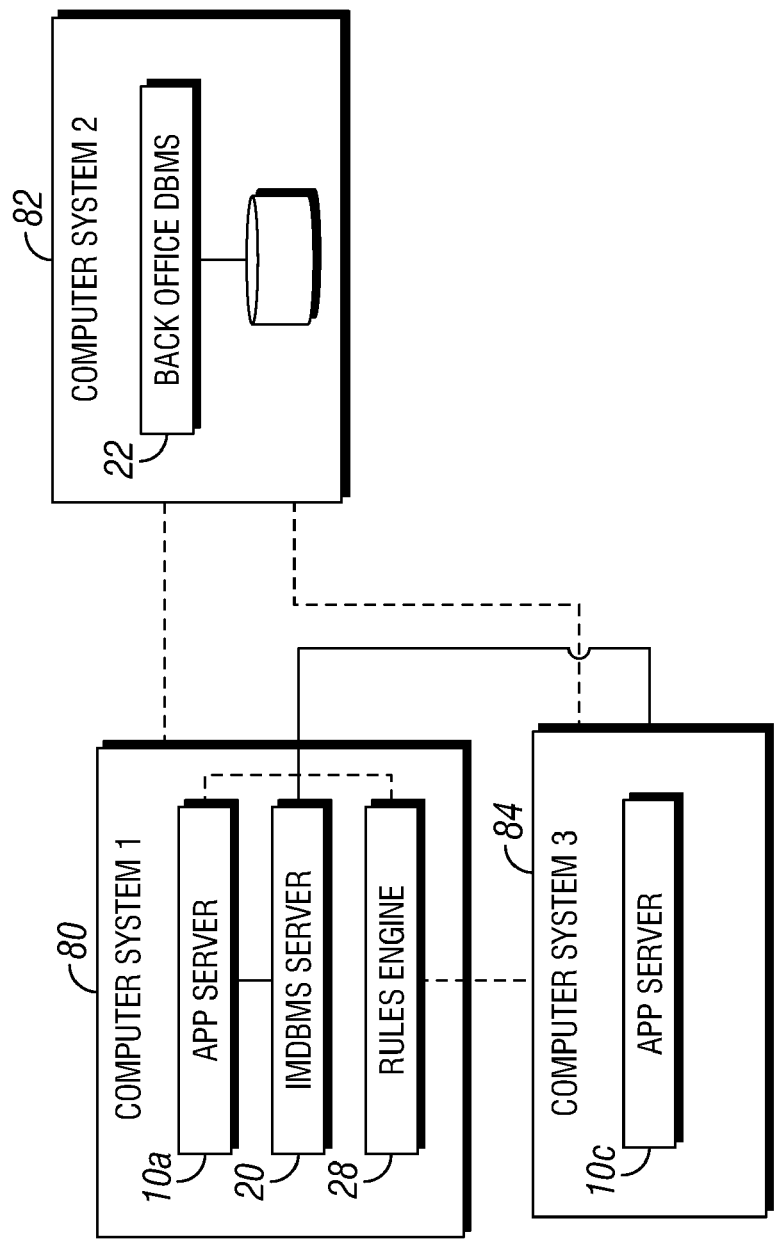
FIG. 7 is a block diagram of another embodiment in which the back office DBMS and the application servers each execute on separate computer systems and where one application server, the IMDBMS server, and the rules engine all execute on the same computer system.

Turning now to FIG. 7 the location on computers of programs cooperating in another embodiment is depicted. The application server 10*a*, IMDBMS 20, and the second rules engine 28 are executing on general computer system #1 80. The back office DBMS 22 executes on general computer system #2 82. It should be understood that it is within the spirit and scope of the present disclosure that the rules engine 17 and second rules engine 28 are combined, separated or distributed as necessary to achieve desired functionality and efficiency. The application server 10*c* is executing on general computer system #3 84. Note that some of these general computer systems may be several computers networked together to increase the collective processing power.

In another embodiment, the application server 10 is a middleware server and the application 11 is middleware, such a VITRIA BUSINESSWARE or IBM CROSSWORLDS, operable on the middleware server. In this embodiment, the wrapper 12 resides as an adaptor or connector in the middleware. In such configuration, collaborations or integration models are provided with access to cache data via the wrapper 12, which is operable as an adapter or connector in the middleware.

While several embodiments have been provided in the present disclosure, it should be understood that the application cache management system may be embodied in many other specific forms without departing from the spirit or scope hereof. The disclosed embodiments are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, the techniques, systems, subsystems and methods described and illustrated in the various embodiments as discreet or separate may be combined or integrated with other systems, modules, techniques, or methods without departing from the scope hereof. Other items shown as directly coupled or communicating with each other may be coupled through some interface or device, such that the items may no longer be considered directly coupled to each, but may still be in communication with one another. Other examples of changes, substitutions, and alterations are readily ascertainable by one skilled in the art and could be made without departing from the spirit and scope of the present disclosure.

What is claimed is:

1. An application specific cache management system stored on a computer readable medium, comprising:
   an in-memory database system for managing application specific cached data;
   an application utilizing application specific data and having a rule related to caching the application specific data, wherein the application defines the rule for the application specific cache;
   a wrapper to receive the application specific data from the application and provide at least a portion of the application specific data and a component of the rule to the in-memory database system, wherein the at least the portion of application specific data is the application specific cache data;
   a rules event table stored in the in-memory database system containing at least one entry comprising a rule type and a reference to the application specific data, the rule type associated with the rule defined by the application; and
   an engine that polls the rules event table, determines that an entry in the rules event table has a rule type that is ready to execute, and applies the rule associated with the rule type of the entry to the application specific cached data referenced by the entry in response to the engine determining that the rule type is ready to execute, wherein the engine determines that the rule type is ready to execute without the involvement of the application, the in-memory database system, or a back office database.

2. The cache management system of claim 1, wherein the component of the rule is further defined as a first component and a second component of the rule.

3. The cache management system of claim 1, wherein the rule defines the functional behavior that is to occur to cache the application specific data.

4. The cache management system of claim 3, wherein the application defines the rule in source code without guidance from the in-memory database system and writes the rule definition into the application specific cached data using the wrapper.

5. The cache management system of claim 1, wherein the wrapper receives at least a portion of the data from the application and the wrapper provides a part of the at least a portion of the data to the in-memory database system.

6. The cache management system of claim 1, further comprising a plug-in operable to communicate with the in-memory database system to receive the data and the component of the rule from the wrapper and communicate the data and information related to the rule to the in-memory database system.

7. The cache management system of claim 1, wherein the engine provides manipulations of application specific cache data that are asynchronous with respect to the application.

8. The cache management system of claim 1, wherein the rule is defined as an asynchronous rule.

9. The cache management system of claim 1, wherein the rule is defined as a synchronous rule.

10. The cache management system of claim 1, wherein the rule includes a refresh data instruction whereby the engine is operable to obtain current data from a database.

11. The cache management system of claim 1, wherein the rule includes a tenure data instruction whereby the engine is operable to release the data after a time period.

12. The cache management system of claim 1, wherein the rule includes a persist data instruction whereby the engine is operable to release the data after a time period unless the data is requested before the expiration of the time period.

13. The cache management system of claim 1, wherein the component of the rule is further defined as a rule type.

14. A system stored on a computer readable medium for managing application specific cached data, comprising:
   a first application server;
   an application operable on the first application server, the application utilizing data and having a rule related to an application specific cache management of the data, wherein the application defines the rules for the application specific cache;
   a second application server;
   an in-memory database management system operable on the second application server to receive the data;
   a wrapper in communication with the application to receive a component of the rule from the application and provide the component of the rule to the in-memory database system;
   a rules event table stored in the in-memory database system containing at least one entry comprising a rule type and a reference to the application specific data, the rule type associated with the rule defined by the application; and an engine that polls the rules event table, determines that an entry in the rules event table has a rule type that is ready to execute, and applies the rule associated with the rule type that is ready to execute to the application specific cached data referenced by the entry, wherein the engine determines that the entry in the rules event table has the rule type that is ready to execute without the involvement of the application, the in-memory database management system, or a back office database.

15. The system of claim 14, wherein the engine is operable on the first application server.

16. The system of claim 14, wherein the wrapper is operable on the first application server.

17. The system of claim 14, wherein the wrapper and the engine are operable on the first application server.

18. The system of claim 14, wherein the engine is operable on the second application server.

19. The system of claim 14, further comprising a third application server and wherein the engine is operable on the third application server.

20. A method of managing cached data stored on a computer readable medium, comprising:

obtaining application data and a component of a rule related to the data from an application, wherein the application defines the rule for an application specific cache;

wrapping the application data and the component of the rule;

providing the wrapped application data and component of the rule to an in-memory database server;

storing a rule event in a rules event table stored in the in-memory database server, wherein the rule event comprises a rule type associated with the definition of the rule and a reference to the application data;

polling the rules event table in the in-memory database server;

when the rule event is ready to be executed, applying the rule associated with the rule event to the wrapped application data associated with the rule event based on the rule component; and caching at least a portion of the wrapped application data according to the rule, to create application cache data;

wherein the rule event is determined ready to be executed without the involvement of the application, the in-memory database server, or a back office database.

21. The method of claim 20, wherein the rule is defined as an instruction related to a cache management of the data.

22. The method of claim 21, wherein the component of the rule is further defined as a rule type related to the instruction.

23. A cache management system stored on a computer readable medium, comprising:

an application utilizing data and having a rule related to caching the data, wherein the application defines the rules for the application specific cache;

an in-memory database management system to receive data;

a wrapper in communication with the application to receive at least a component of the rule;

a rules event table stored in the in-memory database system containing at least one entry comprising a rule type and a reference to the data, the rule type associated with the rule defined by the application; and an engine that polls the rules event table, determines that an entry in the rules event table has a rule type that is ready to execute, and applies the rule associated with the rule type of the entry to the application specific cached data referenced by the entry in response to the engine determining that the rule type is ready to execute, wherein the engine determines that the entry in the rules event table has the rule type that is ready to execute without the involvement of the application, the in-memory database system, or a back office database.

24. The cache management system of claim 23, wherein the data is a refresh data request.

25. The cache management system of claim 23, wherein the rule is an application specific cache data rule.

26. The cache management system of claim 23, wherein the in-memory database management system further includes a storage portion for storing the data utilized by the application.

27. The cache management system of claim 26, wherein the wrapper is further operable to provide at least a portion of the data from the application and a component of the rule to the in-memory database.

28. The cache management system of claim 23, wherein the engine is further operable to remove the data referenced by the entry from the in-memory database management system and to remove the entry from the rules event table.

* * * * *